US006678440B2

(12) United States Patent
Martin

(10) Patent No.: US 6,678,440 B2
(45) Date of Patent: Jan. 13, 2004

(54) OPTIC FIBRE MULTIPLEXER-DEMULTIPLEXER WITH FLATTENED RESPONSE

(75) Inventor: Philippe Martin, Ponchartrain (FR)

(73) Assignee: Cabinet Harle & Phelip, Paris (FR)

( * ) Notice: Subject to any disclaimer, the term of this patent is extended or adjusted under 35 U.S.C. 154(b) by 93 days.

(21) Appl. No.: 09/912,423

(22) Filed: Jul. 26, 2001

(65) Prior Publication Data

US 2002/0064332 A1 May 30, 2002

(30) Foreign Application Priority Data

Jul. 26, 2000 (FR) .......................................... 00 09787

(51) Int. Cl.$^7$ ................................................ G02B 6/28
(52) U.S. Cl. ............................ 385/24; 385/39; 398/79
(58) Field of Search ............................ 385/24, 15, 27, 385/39; 359/124

(56) References Cited

U.S. PATENT DOCUMENTS

| | | | |
|---|---|---|---|
| 5,706,377 A | | 1/1998 | Li |
| 5,809,190 A | * | 9/1998 | Chen ........................... 385/15 |
| 6,229,938 B1 | * | 5/2001 | Hibino ......................... 385/24 |
| 6,263,128 B1 | * | 7/2001 | Huang ......................... 385/24 |
| 6,341,186 B1 | * | 1/2002 | Singh ........................... 385/27 |
| 6,407,376 B1 | * | 6/2002 | Korn ....................... 250/227.23 |

FOREIGN PATENT DOCUMENTS

EP 0 859 249 A1 8/1998

OTHER PUBLICATIONS

P. Martin et al., "Optimized Bulk–Optic Grating Approach for D–WDM Demultiplexers", ECOC '99, Sep. 26–30, 1999, pp. 110 and 111.
W.S. Gornall, "Interferometry Determines Wavelengths Precisely", Laser Focus World, Nov. 1997, pp. 123–127.
A. Zhmud, "New Kind of Multichannel Optical Interconnector for Crossbar Switch Network", Optoelectronics—Devices and Technologies, vol. 7, No. 1, pp 133–142, Jun. 1992.

* cited by examiner

Primary Examiner—Drew A. Dunn
Assistant Examiner—Leo Boutsikaris
(74) Attorney, Agent, or Firm—Arent Fox Plotkin Kintner & Kahn, PLLC

(57) ABSTRACT

This invention relates to an optic multiplexer or demultiplexer comprising an inlet optic fibre, a wavelength dispersive optic system, outlet optic fibres and a two-wave interferometer. The two-wave interferometer has a spectral response exhibiting minima at twice the frequency of the response of the multiplexer or demultiplexer.

12 Claims, 3 Drawing Sheets

OPTIC FIBRE MULTIPLEXER-DEMULTIPLEXER WITH FLATTENED RESPONSE

BACKGROUND OF THE INVENTION

This invention relates to an optical multiplexer-demultiplexer.

The development of optical fibre telecommunications involves the development of numerous components and the improvement of their performances.

This is the case of wavelength multiplexer-demultiplexers that are used for transmitting a very large number of channels via the same fibre.

In such a multiplexer, the incoming luminous fluxes, with different wavelengths, regularly spaced apart, are superimposed in order to generate a multiwavelength flux that will be transmitted by the fibre.

Conversely, at the output of the transmission fibre, a demultiplexer receives the multiwavelength composite flux and generates separate single wavelength fluxes.

The characteristic performances of these multiplexers and/or demultiplexers are the number of channels capable of being transmitted via the same fibre without any risks of crosstalk, i.e. spurious effects generated by one of the channels onto its neighbours and with as low an attenuation as possible, but especially whose amplitude is independent from the wavelength.

To that end, multiplexers and demultiplexers implementing a diffraction grating can be realised.

In particular, for a plane grid with pitch p used in a Littman-Metcalf configuration, a collimated luminous flux, incident by a wavelength $\lambda$ tilted with respect to the normal of the grid of an angle $\theta 1$ is scattered on a dispersion plane perpendicular to the lines of the grid in the form of a collimated beam with a direction tilted by an angle $\theta 2$ with respect to the normal of the grid, $\theta 1$ and $\theta 2$ being connected by the relation $p \sin \theta 1 + p \sin \theta 2 = \lambda$; the mirror of the Littman-Metcalf configuration is then perpendicular to the direction $\theta 2$. The transfer function of the resulting multiplexer-demultiplexer is periodic and composed of peaks whose width at the apex is relatively narrow. This implies that the wavelengths, which do not coincide exactly with the apex of these peaks, may undergo variable attenuations, which is particularly disturbing with systems where global amplification of the multiplexed flux takes place. Therefore, it has been sought to widen the shape at the apex of the peaks of the transfer function even if it is detrimental to the attenuation of the transmitted flux.

We also know the operation of the two-wave interferometers, such as the Fizeau interferometer also known as the little accurate Fabry-Perot interferometer, to which the following description will be referred for non limited exemplification purposes. They comprise two plane mirrors, partially transparent, which form together a cavity. It is known that the spectral response of such Fizeau interferometer is also periodic, that its periodicity depends on the spacing e between the mirrors.

It is known that the use of a Fizeau interferometer with transfer function of the same pitch as that of the multiplexer enables to widen the shape of the peak at its apex.

More precisely, it is known to implement, with the diffraction grating, a Fizeau interferometer with a spectral response of the same pitch as that of the response of the multiplexer-demultiplexer. The Fizeau interferometer diminishes the maximum transmission coefficient, but widens the transmission peaks of the transfer function, at their maximum.

The frequency spacing between two consecutive peaks of the transfer function, of the interferometer is $\Delta f_{FSR}$ (FRS for Free Spectral Range) and this spacing is linked to the thickness e of the Fizeau interferometer by the formula $$\Delta f_{FSR} = c \times 1/(2e)$$

where c corresponds to the speed of light.

From the value of $\Delta f_{FSR}$, the thickness of the Fizeau interferometer can therefore be deduced.

$$e = c/(2 \, \Delta f_{FSR})$$

We also know that a Fizeau interferometer whose mirrors have a reflection coefficient R that is relatively small, the modulation depth, in intensity, in relation to the frequency, of the flux transmitted is approximately 1–4R.

To sum up, as $\Delta f_{WDM}$ is the pitch of the response by the multiplexer, or the interchannel space fixed by the telecommunications system, currently 100 GHz:

$$\Delta f_{WDM} = \Delta f_{FSR} \text{ implies } e = 1.5 \text{ mm}$$

It can then be noticed that the optimal widening of the transfer function of the diffraction grating/interferometer assembly is obtained by a modulation depth $(I_0 - I_1)/I_0$ in the order of 60%.

The purpose of this invention is to realise a multiplexer or a demultiplexer with flattened response, i.e. that is able to transmit signals over a large number of channels, while reducing crosstalk and ensuring, by signal loss, uniform attenuation for all the transmitted channels with enhanced performances with respect to the use of the Fizeau interferometer described above.

The aim of the corresponding improvement was to obtain a uniform transmission spectral range, for every peak, of the width comparable to that of the systems of the previous art, with reduced attenuation, i.e. with a better transmission coefficient.

To that effect, the invention relates to an optic multiplexer or demultiplexer comprising an inlet optic fibre, a wavelength dispersive optic system, outlet optic fibres and a two-wave interferometer.

According to the invention, the two-wave interferometer has a spectral response exhibiting minima at twice the response frequency of the multiplexer or demultiplexer.

As a result of the claimed configuration, the attenuation generated by the Fizeau filter shows a curvature close to the reverse of that of the transmission function of the grating. The curvatures generate by reciprocal compensation a resulting composite function whose transmission coefficient, close to its maximum, is relatively uniform that makes it look rather like a strobe function. This result is obtained while preserving good transmission of the whole system. The transmission function of the two-wave interferometer (preferably a Fizeau filter) also exhibits a minimum between two maxima of the transfer function of the multiplexer. The minimum corresponds then to a minimum of that transfer function of the multiplexer and therefore does not affect the latter. The efficiency of the filter is then boosted without any significant shortcoming.

This invention also relates to the characteristics that will become evident with the following description and that will be considered individually or in all their technically possible combinations:

the interferometer is a Fizeau interferometer, the inlet and output fibres are single-mode fibres, the reflector of the dispersive system is plane, the multiplexer operates in the 1525–1625 nm range, the multiplexer processes approx. 16 to 128 channels spaced by 50 or 100 GHz.

BRIEF DESCRIPTION OF THE DRAWINGS

The invention will be described more in detail with reference to the appended drawings on which.

DETAILED DESCRIPTION OF THE INVENTION

Figure 1:
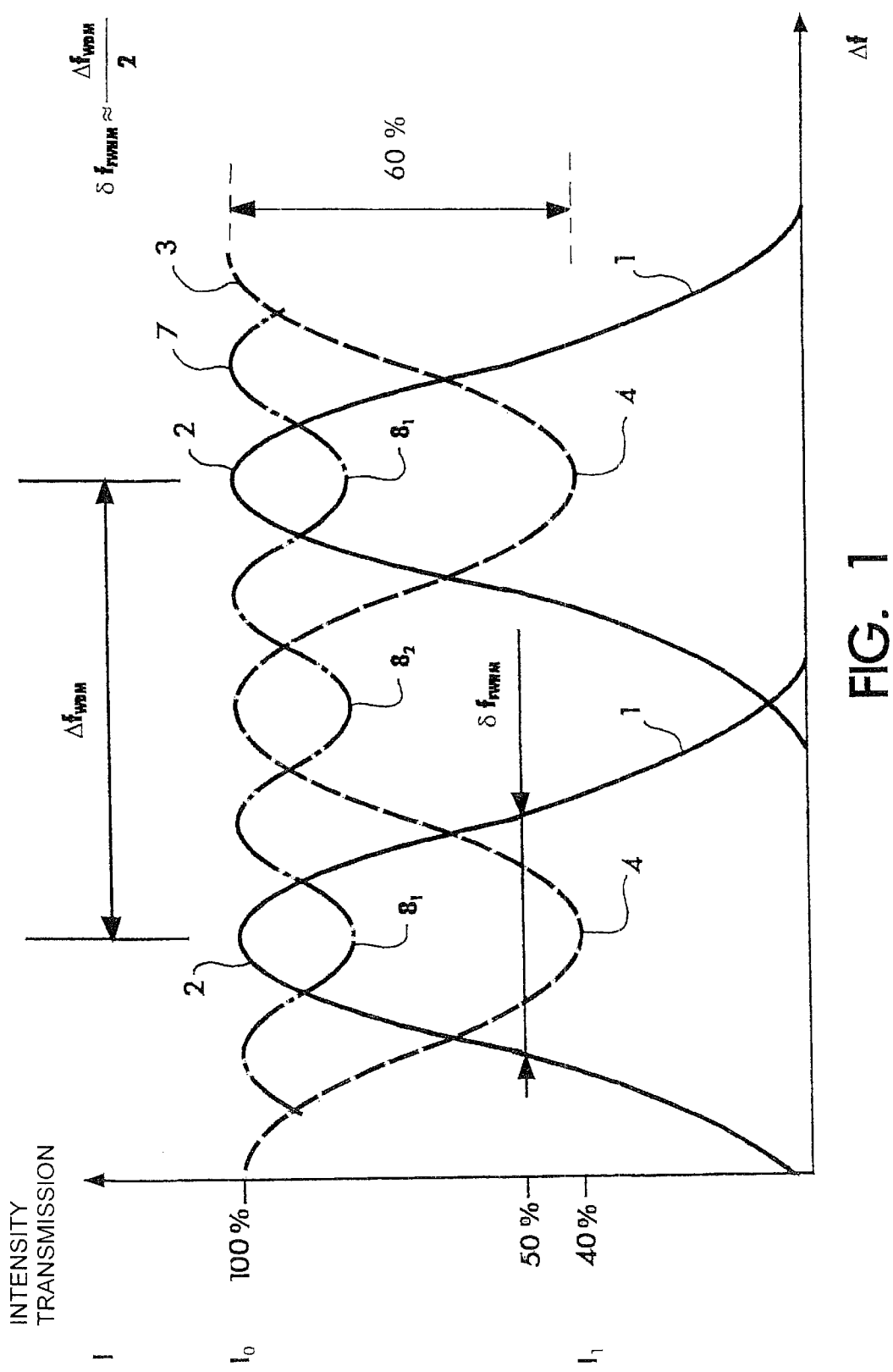
FIG. 1 represents the spectral transmission curvature of a multiplexer-demultiplexer, that of a Fizeau filter of same frequency and that of a Fizeau filter with double frequency.

More precisely, FIG. 1 represents the transfer function 1 of a multiplexer without any interferometer. It is composed of peaks 2 also frequency-spaced. In telecommunications systems, it has been sought to transmit the largest possible number of channels inside a spectral band with given length. Crosstalk between the channels should therefore be avoided and transmission of the different channels with uniform losses should be guaranteed.

These constraints lead to a compromise that is generally agreed upon:

As the halfway height of a peak is equal to $\delta f_{FWHM}$ (FWHM for Full Width at Half Maximum), optimal spacing between two successive peaks is then $\Delta f_{WDM} \approx 2\delta f_{FWHM}$.

Until now, a Fizeau filter with a response of the same pitch as that of the multiplexer, i.e. generating a represented attenuation by the curve 3, composed of a series of quasi-sinewave oscillations, has been inserted in such a multiplexer.

As stated above, we know that the modulation depth of the response curve of such an interferometer or Fizeau filter is 1–4R where R is the reflection coefficient of two mirrors, when the interferometer is used for transmission. The coefficient R determines thus the curvature around each minimum 4. A high coefficient R generates a response with weak minima 4 and whose curvature is marked; a small coefficient R generates higher minima 4 and with little curvature.

Figure 2:
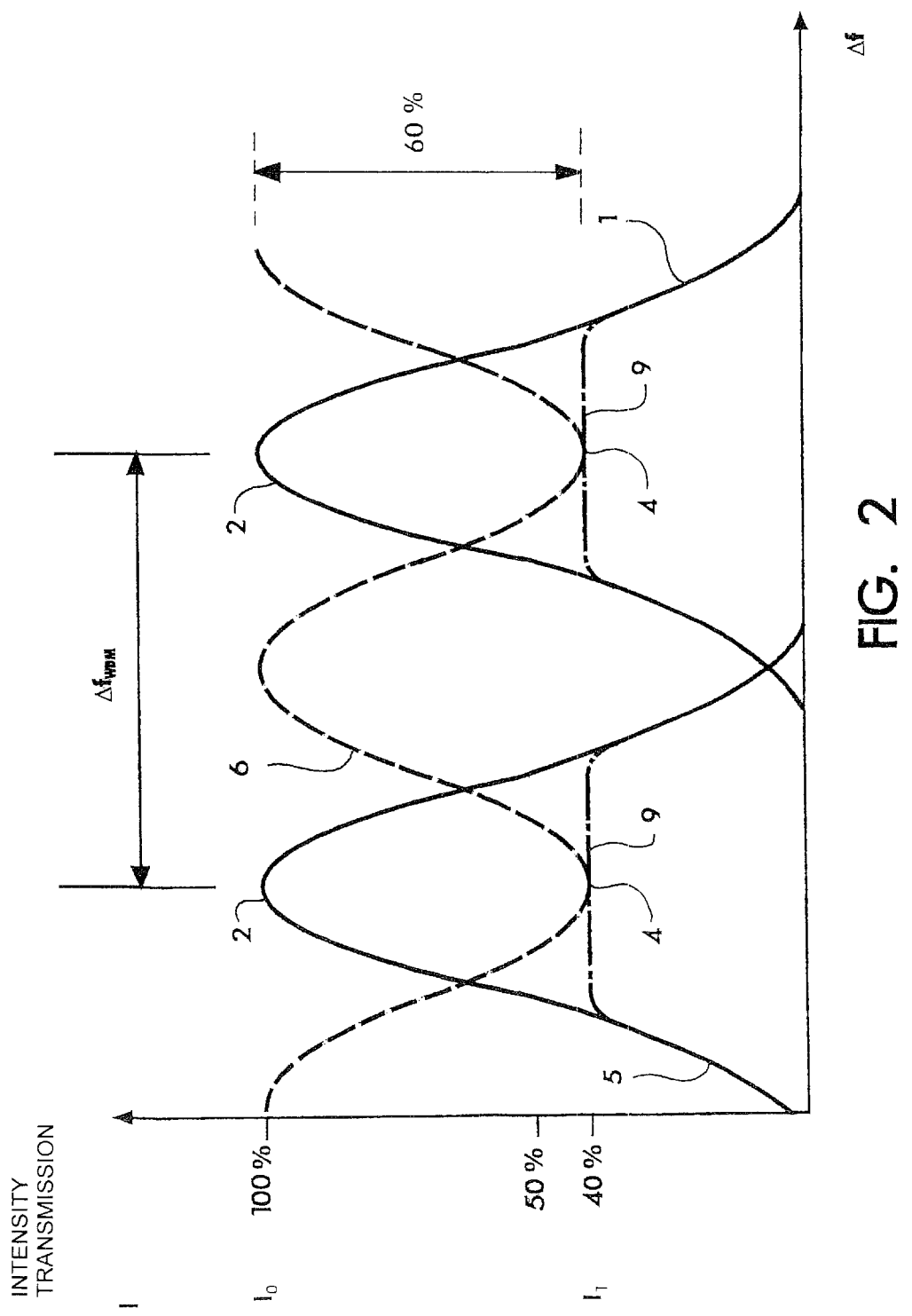
FIG. 2 represents the spectral transmission curve of a multiplexer-demultiplexer, respectively without and with a Fizeau filter, of same frequency, as well as the transmission curve of the filter alone.

Thus, as presented on FIG. 2, obtaining the response curve 5 of the composite assembly comprising a multiplexer and an interferometer implies matching the curvature of the minima 4 of the response 6 of the interferometer with that of the peaks 2 of the response of the dispersive system. In practice, this relatively high value causes high attenuation of the amplitude of the peaks 9 of the response 5 when using the Fizeau interferometer.

Figure 3:
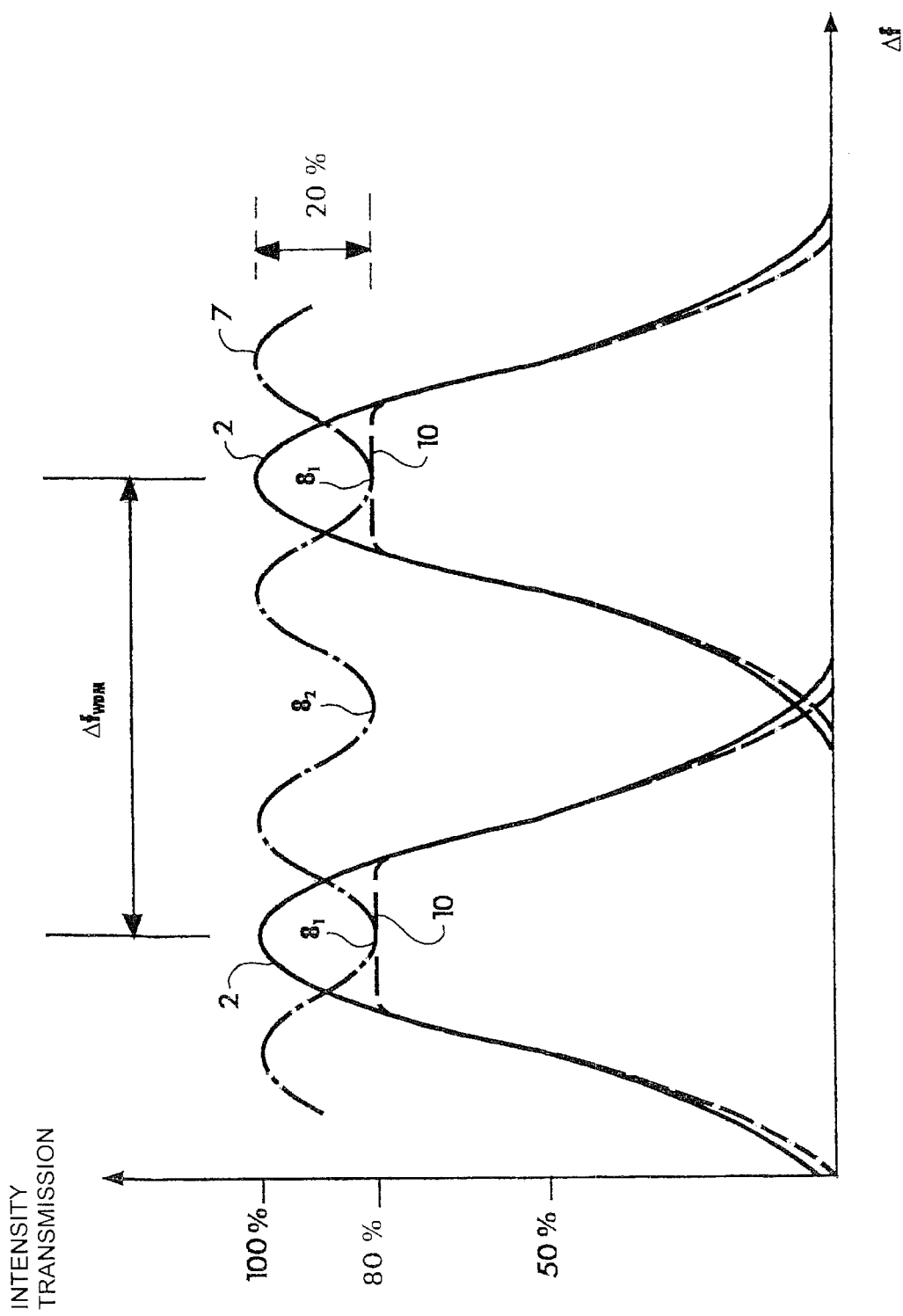
FIG. 3 represents the spectral transmission curve of a multiplexer-demultiplexer, respectively without and with a Fizeau filter, of double frequency, as well as the transmission curve of the filter alone.

To avoid these constraints, according to the invention, we use a two-wave interferometer exhibiting minima at twice the frequency of that of the peaks of the dispersive optic system, as represented on FIG. 3.

The two-wave interferometer has a periodic spectral response 7 exhibiting minima, alternatively $8_1$ and $8_2$.

The minima $8_1$ coincide each with a peak 2 of the spectral response of the multiplexer; conversely, the minima $8_2$ coincide with minima of that response of the dispersive system.

The relation between the coefficient R and the curvature at the apex of the response of the two-wave interferometer is obviously of the same nature as previously, but as its frequency is double, it comes close to the curvature of the peaks 2 of the response of the dispersive system for a much smaller value of R, i.e. under conditions generating much smaller attenuation of the signal.

In total, the composite response 10 produced by the association of the dispersive system and of the two-wave interferometer exhibits flattened maxima, close to a strobe function with a small attenuation coefficient.

The description was made with respect to a multiplexer. It is transposable directly to the realisation of a demultiplexer or of a router.

According to the invention, we then implement an interferometer or a Fizeau filter whose response is half a pitch and whose attenuation curve represented on FIG. 3 is referred to as 7. It exhibits minima coinciding with the maxima 2 of the response 1 of the multiplexer, and, between two maxima of that curve, at least another minimum coinciding with a minimum of the response curve of the multiplexer.

What is claimed is:

1. An optic multiplexer or demultiplexer comprising:

an inlet optic fibre, a wavelength dispersive optic system, outlet optic fibres and a two-wave interferometer, characterised in that the two-wave interferometer has a spectral response exhibiting minima at a frequency twice the response frequency of the multiplexer or demultiplexer and the wavelength dispersive optic system comprises a diffraction grating and a reflector.

2. An optic multiplexer or demultiplexer according to claim 1, characterised in that the interferometer is a Fizeau interferometer.

3. An optic multiplexer or demultiplexer according to one of the claims 1 or 2, characterised in that the inlet and outlet fibres are single-mode fibres.

4. An optic multiplexer or demultiplexer according to one of claims 1 or 2, characterised in that the reflector of the dispersive system is plane.

5. An optic multiplexer or demultiplexer according to one of claims 1 or 2, characterised in that the multiplexer or demultiplexer operates in the 1525–1625 nm range.

6. An optic multiplexer or demultiplexer according to one of claims 1 or 2, characterised in that the multiplexer or demultiplexer processes 32 to 128 channels spaced by 100 or 50 GHz.

7. An optic multiplexer or demultiplexer according to claim 3 characterised in that the reflector of the dispersive system is plane.

8. An optic multiplexer or demultiplexer according to claim 3, characterised in that the multiplexer or demultiplexer operates in the 1525–1625 nm range.

9. An optic multiplexer or demultiplexer according to claim 4, characterised in that the multiplexer or demultiplexer operates in the 1525–1625 nm range.

10. An optic multiplexer or demultiplexer according to claim 3, characterised in that the multiplexer or demultiplexer processes 32 to 128 channels spaced by 100 or 50 GHz.

11. An optic multiplexer or demultiplexer according to claim 4, characterised in that the multiplexer or demultiplexer processes 32 to 128 channels spaced by 100 or 50 GHz.

12. An optic multiplexer or demultiplexer according to claim 1 or 2, characterised in that the diffraction grating and the reflector are in a Littman-Metcalf configuration.

* * * * *

UNITED STATES PATENT AND TRADEMARK OFFICE
CERTIFICATE OF CORRECTION

PATENT NO. : 6,678,440 B2
DATED : January 13, 2004
INVENTOR(S) : Philippe Martin It is certified that error appears in the above-identified patent and that said Letters Patent is hereby corrected as shown below:

Title page,
Item [73], Assignee, please delete "Cabinet Harle & Phelip, Paris (FR)" and substitute therefore -- NetTest Photonics S.A.S., Les Clayes sous Bois (FR) --.

Signed and Sealed this

Twenty-sixth Day of July, 2005

JON W. DUDAS
*Director of the United States Patent and Trademark Office*